United States Patent Office 2,840,015
Patented June 24, 1958

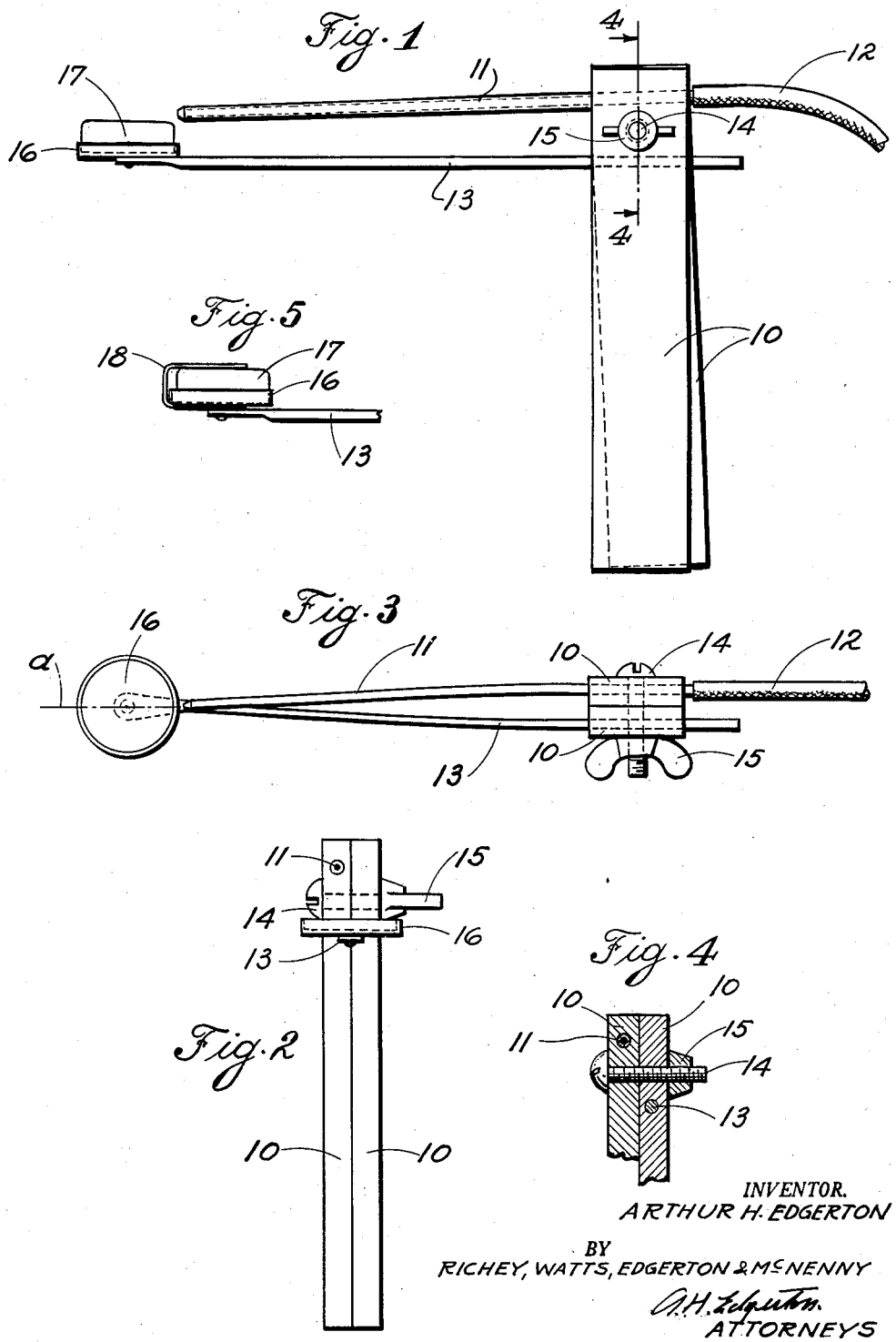

2,840,015

DRY FUEL BLOW TORCH

Arthur H. Edgerton, Rocky River, Ohio

Application May 23, 1956, Serial No. 586,735

3 Claims. (Cl. 110—3.5)

This invention relates to improvements in dry fuel blow pipes for soldering annealing and brazing small work pieces.

One of the objects of the invention is to provide a horizontally adjustable fuel carrier and a blow pipe mounted for vertical arcuate adjustment relative to each other.

Another object of the invention is to provide a handle embodying a pair of pivotally connected heat insulating blades formed to facilitate horizontal adjustment of both the fuel carrier arm and blow pipe.

A further object of the invention is to provide a handle which will accommodate adjustment of the blow pipe and fuel carrier towards each other by a squeezing action of the handle blades as the fuel burns down during the operation of the torch or blow pipe assembly.

Another object of the invention is to provide a handle embodying a pair of blades having horizontal bores therein for the frictional retention of the fuel carrier arm and blow pipe, an intermediate cross bore for a screw constituting the fulcrum for the blades, and a clamping medium to restrain axial movement of the blow pipe and fuel carrier arm.

Further objects of the invention reside in a structure which is efficient of operation, light in weight, durable of structure, and economic of manufacture.

Other objects and advantages more or less ancillary to the foregoing, and the manner in which all the various objects are realized, will appear in the following description, which considered in connection with the accompanying drawings, sets forth the preferred embodiment of the invention.

Referring to the drawings:

Fig. 1 is a side elevational view of the improved blow pipe assembly or torch;

Fig. 2 is an end elevational view thereof;

Fig. 3 is a plan view of the torch;

Fig. 4 is a vertical sectional view of the torch, the section being taken on a plane indicated by the line 4—4 in Fig. 1; and Fig. 5 is a side elevational view of a fragmentary portion of the torch illustrating a modified form thereof.

Referring first to Fig. 1, the blow pipe assembly or torch comprises a handle embodying a pair of rectangular flat bar members 10 preferably formed of Masonite, each approximately one-quarter of an inch thick, three-quarters of an inch wide, and from four to five inches in length. The upper end portion of one of the blades is drilled horizontally for the snug engagement of a small blow pipe tube 11 having a flexible plastic hose 12 on an end thereof. The second blade is drilled in a similar manner for the frictional support of a wire fuel carrier arm 13, the diameter thereof being substantially equal to that of the blow pipe 11. The two blades are united by a machine screw 14 disposed between the blow pipe and carrier arm 13, and a wing nut 15 is mounted on the screw to facilitate frictional contact between the blades. The arm 13 has a shallow metallic cup 16 welded or riveted upon the outer end thereof for the support of a circular tablet 17 of solidified alcohol.

The arm 13 and the tube 11 are bent, upon assembly, to position the end of the tube 11 in aligned relation with the center line a of the tablet, and the handle blades 10 are then adjusted to position the blow pipe slightly above the top of the circumferential edge of the tablet 17.

The cup 16 may be of a diameter which will frictionally engage the tablet 17, or may be slightly larger than the tablet, and a spring wire clamp 18, secured to the base of the cup, may be employed to hold the fuel in place before the tablet is fused to the cup.

In operation, the arm 13 and blow pipe 11 are adjusted in the manner described above, then the fuel is ignited and the operator blows through the hose 12 to produce a fine elongated flame or blast. As the tablet burns down, the operator may readjust the position of the blow pipe 11 and arm 13 by merely squeezing the handle blades together until the proper length and form of the flame is attained. It will be noted that readjustment of the blow pipe requires the use of but one hand and leaves the other hand of the operator free to manipulate the work pieces being held, soldered, brazed or annealed.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A blow pipe assembly comprising a pair of wood fiber bars constituting a handle, said bars being of rectangular cross-section and of a length approximately five times the width thereof, a machine screw pivotally connecting said bars to each other adjacent their upper ends, a tube frictionally engaged in one of said bars above said screw and in transverse parallel relation to the face thereof that defines the width of the bar, a rod frictionally engaged in the other of said bars below said screw and in transverse parallel relation to the face thereof that defines the width of the bar, a shallow circular dry fuel cup on one end of said rod, the free end of said tube being disposed superjacent the circumferential edge of said cup in aligned relation with said rod, and a flexible hose on the opposed end of said tube.

2. A blow pipe comprising a pair of heat insulating bars, a screw adjacent the upper ends thereof pivotally connecting said bars to each other, a tube on one of the bars above said screw and in normal parallel relation to the face of the width of the bar, a rod on the other bar below said screw and in normal parallel relation to the face of the width thereof, a shallow circular cup on the outer end of said rod, one end of said tube terminating above said rod and adjacent the circumferential edge of said cup, a hose on the other end of said tube, said rod and said tube being mounted for axial adjustment relative to said bars and being vertically adjustable relative to each other by the pivotal actuation of said bars.

3. A dry fuel blow pipe torch comprising a pair of wood fiber handle members of rectangular cross-section, a tube mounted for axial adjustment on one of said members normal and parallel to the face of the width thereof, a flexible hose on the inner end thereof, a rod mounted for axial adjustment on the other of said handle members normal and parallel to the face of the width thereof, a circular dry fuel cup on the outer end of said rod subjacent the free end of said tube and contiguous the circumferential edge of said cup, a screw pivotally connecting said handle members together intermediate said tube and said rod, and a nut on said screw for the frictional retention of said handle members, said rod and said tube in their adjusted positions.

References Cited in the file of this patent

UNITED STATES PATENTS

| | | |
|---|---|---|
| 473,197 | Peebles | Apr. 19, 1892 |
| 1,262,499 | Howell | Apr. 9, 1918 |
| 1,763,894 | Lagier | June 17, 1930 |
| 2,500,339 | Birk | Mar. 14, 1950 |